B. M. BESKOW.
RECEPTACLE.
APPLICATION FILED AUG. 28, 1920.
1,420,906. Patented June 27, 1922.
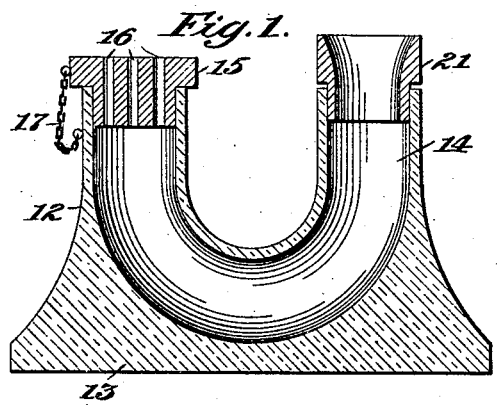
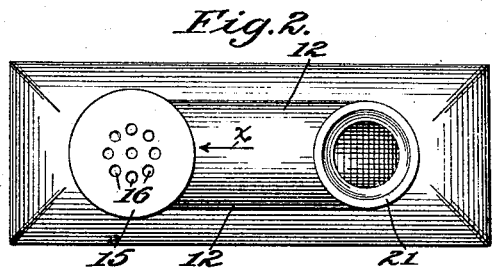
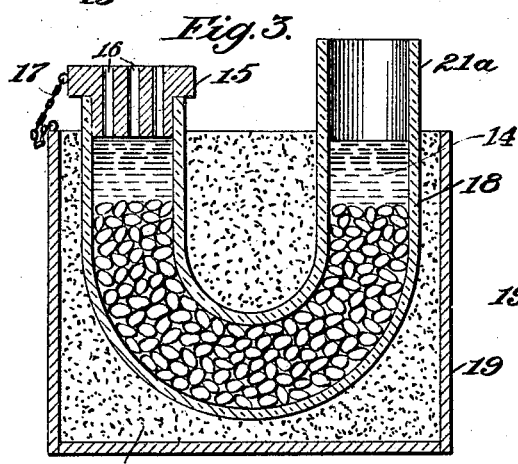
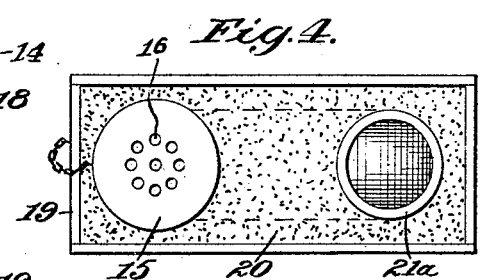
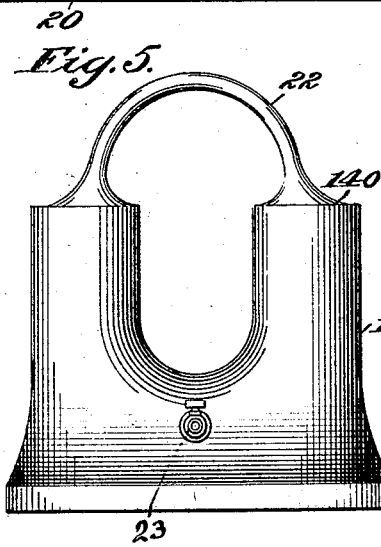
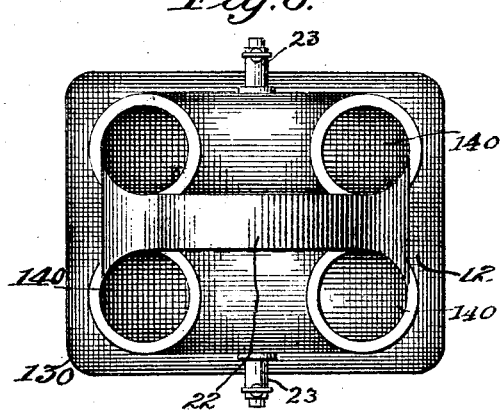
Inventor:
Bernhard M. Beskow,
by Kalver Kahn,
Att'ys.

UNITED STATES PATENT OFFICE.

BERNHARD M. BESKOW, OF MIAMI, FLORIDA.

RECEPTACLE.

1,420,906.  Specification of Letters Patent.  Patented June 27, 1922.

Application filed August 28, 1920. Serial No. 406,614.

*To all whom it may concern:*

Be it known that I, BERNHARD M. BESKOW, a citizen of the United States, residing at Miami, in the county of Dade and State of Florida, have invented or discovered certain new and useful Improvements in Receptacles, of which the following is a specification, reference being had therein to the accompanying drawing.

This invention relates to receptacles, and especially, although not exclusively, to a receptacle for eggs or other articles which it may be desired to pack in water-glass or other fluid for the purpose of preserving the same. According to the present manner of preserving eggs in water-glass they are placed in an open topped receptacle and immersed in the liquid water-glass, fresh eggs being often added from time to time to those in the receptacle. In taking out eggs for use they are of course taken from the top, and thus the freshest eggs are are taken out, whereas it would be much better if the eggs which were first placed in the receptacle were first removed instead of the freshest ones. This invention has for its primary object to provide a receptacle for eggs or the like to be immersed in liquid and from which the eggs first placed in the receptacle may conveniently be removed, instead of the freshest ones.

In the accompanying drawing Fig. 1 is a vertical section of one form of receptacle embodying the present invention, and Fig. 2 is a plan view of the same. Fig. 3 is a vertical sectional view of another form of the invention, and Fig. 4 is a plan view of the form of the invention illustrated in Fig. 3. Figs. 5 and 6 are similar views illustrating still another form of the invention.

Referring to Figs. 1 and 2, the receptacle, which may be of glazed earthenware or other material, consists of a body portion 12 having a suitable base 13, said body portion having a U-shaped chamber 14 with two open upper ends. The walls of said chamber are imperforate throughout the length of said chamber, so that it will hold liquid with which it may be filled. To one of the upper ends of the U-shaped chamber a plug or cover 15 may be fitted, said plug or cover being preferably provided with perforations 16, for ventilation, and said plug or cover may be permanently connected with the receptacle by means of a chain 17. This plug or cover is simply a means for indicating from which end of the receptacle the eggs are to be removed or taken out, and any other suitable means, or a suitable mark, as arrow $x$, pointing to this end, may be employed for this purpose.

Referring to Figs. 3 and 4 the receptacle is in the form of a U-shaped tube 18 one open end of which is preferably provided with a perforated plug or cover 15. The tubular U-shaped receptacle 18 is supported in an upright position by any suitable holder, which, in the present instance, consists of a box 19 filled with comminuted material 20, as sawdust or the like. This will prevent the tubular receptacle 18, which may be of glass, oil paper, or other more or less fragile material, from being accidentally broken.

From the foregoing it will be understood that the receptacle can be filled with eggs immersed in water-glass and that fresh eggs can be added to those in the receptacle from time to time, as by dropping them into the open top of the right hand member of the U-shaped receptacle, while the eggs which are desired to be used may be removed from the left hand part of the U-shaped receptacle when the plug or cover 15 is taken off.

It may be desirable to change the liquid water-glass from time to time, and to this end one member of the U-shaped receptacle may be provided with a closely-fitting removable extension 21, as shown in Fig. 1; or one member of the receptacle may be provided with a permanent extension $21^a$, as shown in Fig. 3. With one member of the tubular receptacle thus elongated so as to extend above the top of the other member, it will be understood that fresh liquid water-glass poured into the extended member will force out the stale liquid water-glass from the other member of the receptacle, by hydrostatic pressure, to any extent desired, without disturbing said receptacle or its contents.

Although my improved receptacle is primarily intended for preserving purposes, as hereinbefore indicated, it is obvious that it may be used as a container or carrier for liquids or such other articles as may be desired. Also for convenience it may be provided with a handle, as 22, Figs. 5 and 6, by which it may be carried or moved about if desired. The last-named figures illustrates a double receptacle comprising two U-shaped chambers 140 mounted on a common base 130 and each provided, if so desired, at its lowest point with a draw off faucet 23 by means of which said chambers may be conveniently emptied.

It will be observed that all of the receptacles above described are extremely sanitary, there being no depressions or corners to harbor germs, and the smooth interior surfaces being readily accessible throughout and easily cleaned.

Having thus described my invention I claim and desire to secure by Letters Patent:

1. A storage receptacle adapted to hold eggs, comprising a U-shaped tubular storage chamber both upper ends of which are open for access thereto, said chamber having imperforate walls throughout its length and being adapted to hold a preserving liquid for the eggs, and a base by which said receptacle may be supported in an upright position.

2. A storage receptacle adapted to hold eggs, comprising a U-shaped tubular storage chamber both upper ends of which are open for access thereto, said chamber having imperforate walls throughout its length and being adapted to hold a preserving liquid for the eggs, and a base by which said receptacle may be supported in an upright position, one member providing said U-shaped chamber being provided with a tubular extension the top of which is above the top of the other member, so that the preserving liquid may be changed, by hydrostatic pressure, without disturbing said receptacle or its contents.

In testimony whereof I affix my signature.

BERNHARD M. BESKOW.